(12) United States Patent
Neuman et al.

(10) Patent No.: US 7,315,962 B2
(45) Date of Patent: Jan. 1, 2008

(54) MANAGING BOOT ERRORS

(75) Inventors: Paul Neuman, Claix (FR); Yann Stephan, Echirolles (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 567 days.

(21) Appl. No.: 10/387,840

(22) Filed: Mar. 14, 2003

(65) Prior Publication Data
US 2003/0212936 A1    Nov. 13, 2003

(30) Foreign Application Priority Data
Mar. 14, 2002    (EP)    .................................. 02354045

(51) Int. Cl.
*G06F 11/00*    (2006.01)
(52) U.S. Cl. ........................................... 714/36; 713/2
(58) Field of Classification Search .................. 714/36; 715/536
See application file for complete search history.

(56) References Cited

U.S. PATENT DOCUMENTS

| | | | | |
|---|---|---|---|---|
| 5,245,615 A * | 9/1993 | Treu | ............................. | 714/45 |
| 5,444,850 A | 8/1995 | Chang | | |
| 5,884,073 A * | 3/1999 | Dent | ............................. | 713/2 |
| 5,974,546 A * | 10/1999 | Anderson | ....................... | 713/2 |
| 6,119,079 A * | 9/2000 | Wang et al. | ..................... | 704/8 |
| 6,185,678 B1 * | 2/2001 | Arbaugh et al. | ................ | 713/2 |
| 6,230,285 B1 * | 5/2001 | Sadowsky et al. | ............. | 714/14 |
| 6,393,559 B1 * | 5/2002 | Alexander | ....................... | 713/2 |
| 6,463,531 B1 * | 10/2002 | Aguilar et al. | .................. | 713/2 |
| 6,550,019 B1 * | 4/2003 | Ahrens et al. | ................. | 714/10 |
| 6,625,728 B1 * | 9/2003 | Ahrens et al. | .................. | 713/2 |
| 6,745,343 B1 * | 6/2004 | Barenys et al. | ................ | 714/36 |
| 6,763,456 B1 * | 7/2004 | Agnihotri et al. | .............. | 713/2 |
| 6,839,853 B2 * | 1/2005 | Odaohhara et al. | ......... | 713/300 |
| 6,889,340 B1 * | 5/2005 | Bramley, Jr. | .................... | 714/6 |
| 7,165,202 B2 * | 1/2007 | Eatough et al. | ............. | 714/746 |
| 2003/0070115 A1 * | 4/2003 | Nguyen et al. | ................ | 714/23 |

FOREIGN PATENT DOCUMENTS

JP    10 161900    6/1998

OTHER PUBLICATIONS

Liebing et al., "A Look at the Error Handling SET Parameters from the NetWare Remote Management Utility", 'Online NOVELL XP002212143' Retrieved from the Internet: <URL:http://developer.novell.com/research/sectins/netmanage/btb/2002/January/b020101.pdf> retrieved on Sep. 4, 2002.
Anonymous, "Hardware and Volume Statistical Analysis and Reporting System for Detecting and Isolating Media and Hardware Errors on the Magstar Family of Tape Drives", Research Disclosure, Kenneth Mason Publications, Hampshire, GB, No. 428, Dec. 1, 1999, pp. 1729 XP002168380.

* cited by examiner

*Primary Examiner*—Robert Beausoliel
*Assistant Examiner*—Philip Guyton

(57)    ABSTRACT

A system (100) and a method (500) for managing boot errors. When errors occur during boot, the errors may be recorded in non-volatile storage (115). The errors in the non-volatile storage (115) may be retrieved, decoded, and displayed in a form more understandable to the user. Also, tie errors may be analyzed to efficiently detect and correct the causes of the errors. In addition, the analysis may be used to prevent errors altogether.

11 Claims, 6 Drawing Sheets

MANAGING BOOT ERRORS

FIELD OF THE INVENTION

This invention relates generally to managing boot errors. More specifically, this invention relates to system and method to logging and processing boot errors of one or more data processing systems.

BACKGROUND OF THE INVENTION

Before a typical computer can execute software applications, the computer must load an operating system from a disk to its working memory, which is typically random access memory ("RAM"). This function is carried out through "boot-strapping", otherwise simply known as "booting" the computer. Booting automatically occurs when the computer is powered on. Booting may also occur when a user resets the computer.

One of the functions performed during booting is the Power On Self Test ("POST"), which is a part of the computer's Basic Input/Output System ("BIOS"). The POST initializes the internal hardware components of the computer such as timers, Direct Memory Access ("DMA") controllers, memory controllers, I/O devices, video hardware, and the like. As part of its initialization, POST performs a reliability test to check that the computer's components are functioning correctly.

If POST completes without errors, the hardware components are initialized and the operating system is loaded from a persistent storage such as a hard disk. At this point, the computer may be utilized. However, if errors do occur during the booting process, a message related to each boot error may be displayed. If the boot error is serious enough, booting may terminate altogether.

At least one drawback with the typical booting is that the boot errors are not saved. Accordingly, the errors cannot be collected and later analyzed. Also the user may miss the error messages altogether if the user is not immediately present when the boot errors occur. Another drawback is that the error messages may be difficult to understand. For example, the error message may simply be an error number. Such error messages often require a secondary source, such as a user's manual, to decode the error message. In another example, the error message may not be displayed in user's native language. In general, the boot errors of a typical data processing system are difficult to process.

SUMMARY OF THE INVENTION

According to an embodiment of the present invention, a boot error manager for a data processing system includes an error log module configured to log one or more boot errors of the data processing system in a non-volatile storage and an error processing module configured to process the one or more boot errors stored in the non-volatile storage.

According to another embodiment of the present invention, a method to manage boot errors of a data processing system includes logging boot errors of the data processing system in a non-volatile storage and processing the boot errors stored in the non-volatile storage.

BRIEF DESCRIPTION OF THE FIGURES

Features of the present invention are described in part with reference to the following figures, in which.

DETAILED DESCRIPTION

For simplicity and illustrative purposes, the principles of the present invention are described by referring mainly to exemplary embodiments thereof. However, it should be understood that the same principles are equally applicable to and may be implemented in many data processing systems where errors may occur, and that any such variation does not depart from the true spirit and scope of the present invention.

Moreover, in the following detailed description, references are made to the accompanying figures, which illustrate specific embodiments in which the present invention may be practiced. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

In one embodiment of the present invention, boot errors from a data processing system are managed. The boot errors are logged to a non-volatile storage and processed. Examples of non-volatile storage include flash memory, hard disk, floppy disk, and the like. It should be understood that many other types of non-volatile storages may be used. By using a non-volatile storage, the logged errors may be retrieved and analyzed for troubleshooting purposes at a later time. For example, historical and/or statistical analysis may be performed on the logged errors.

Figure 1:
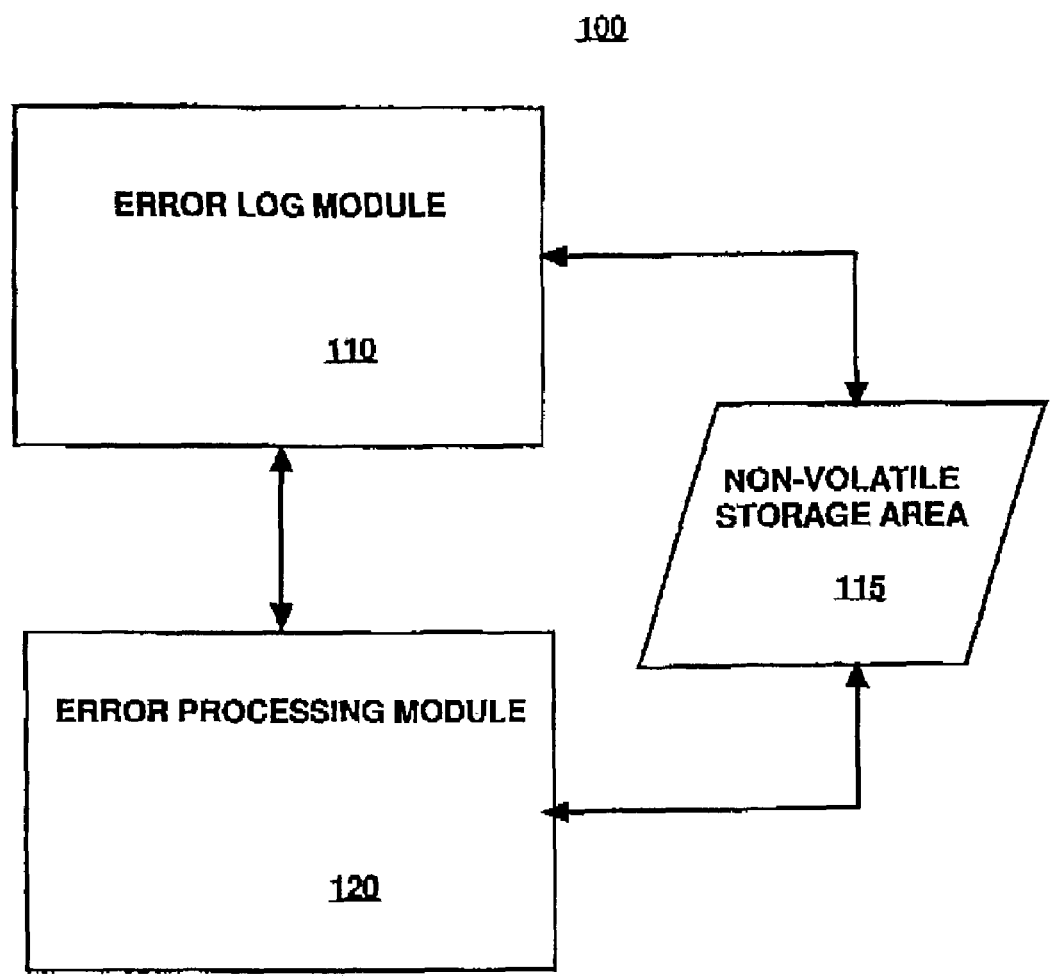
FIG. 1 illustrates a block diagram of a boot error manager according to an embodiment of the present invention.

FIG. 1 illustrates a block diagram of a boot error manager 100 according to an embodiment of the present invention. As shown in FIG. 1, the boot error manager 100 includes an error log module 110, a non-volatile storage 115, and an error processing module 120. The error log module 110 may be configured to log/record any errors generated by a data processing system during a boot process. In one embodiment, the error log module 110 may be part of the BIOS which includes instructions to write to the non-volatile storage 115 in case of errors, in another embodiment, the error log module 110 may monitor bus activities of the data processing system and may copy the boot errors to the non-volatile storage 115 whenever the errors occur. Other options exist to monitor and record booting errors. Again, many types of non-volatile storage may be used including flash memory, hard disk, floppy disk and the like.

Figure 2:
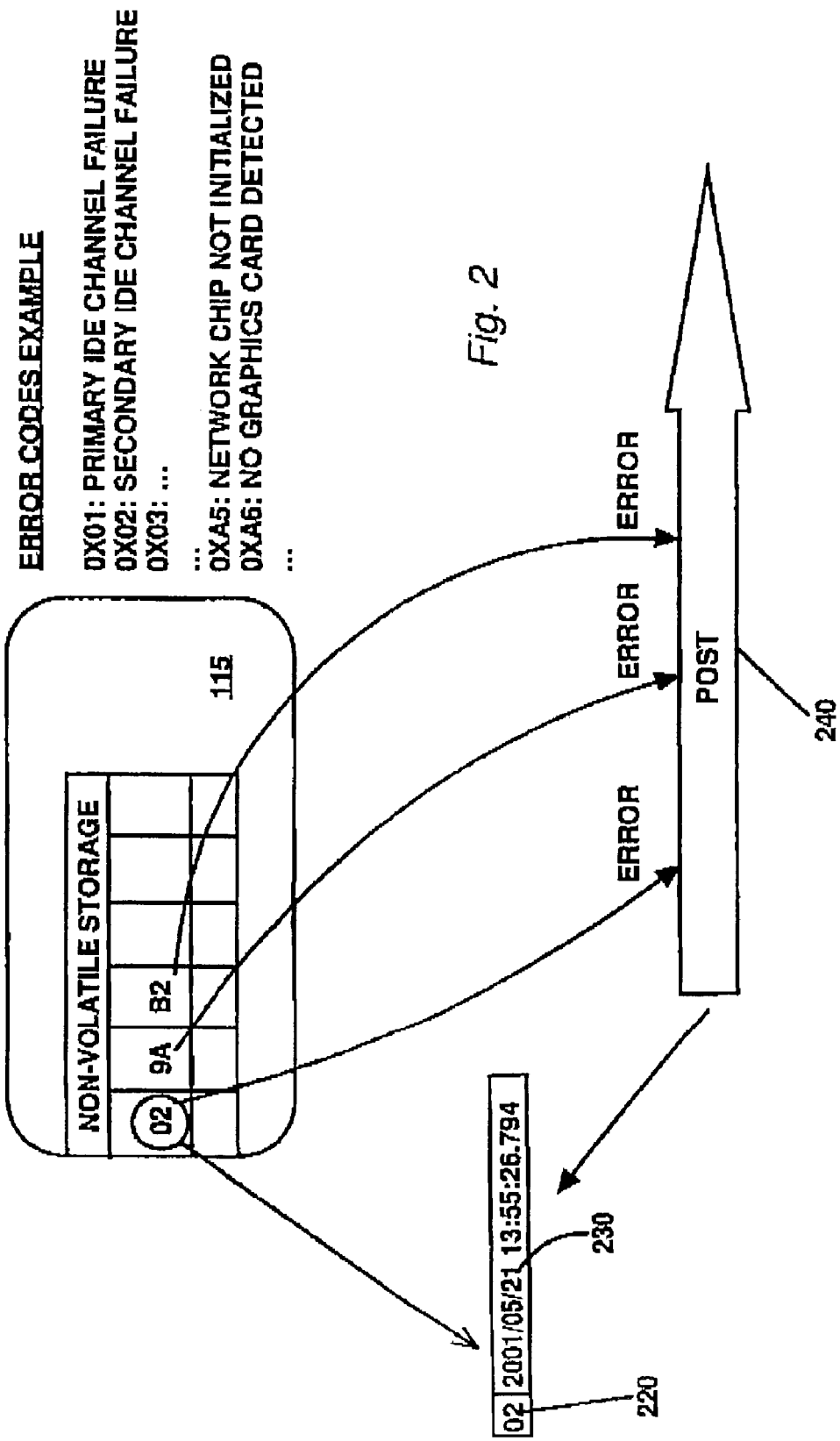
FIG. 2 illustrates a storage scheme to log boot errors to a non-volatile storage according to an embodiment of the present invention.

FIG. 2 illustrates a storage scheme 200 to log boot errors to the non-volatile storage 115 according to an embodiment of the present invention. As shown in FIG. 2, a format of the boot error information stored in the non-volatile storage 115 includes an error code 220 and a time stamp 230 corresponding to each recorded error. Example error codes 220 include "Primary IDE Channel Failure", "Secondary IDE Channel Failure", and so on. In addition to the error code 220, a time of the error occurrence is recorded in the time stamp 230. The time stamp 230 corresponds to specific time point during a POST time line 240.

Referring back to FIG. 1, the error processing module 120 may be configured to process the boot errors stored in the non-volatile storage 115. In an embodiment of the present invention, the error processing module 120 may retrieve the boot errors from the non-volatile storage 115, decode the boot errors, and display the decoded boot errors. The error processing module 120 may also display the boot error in one or more languages. The error processing module 120 may further analyze the boot errors so that errors are efficiently detected and corrected and potential errors are avoided.

Figure 3:
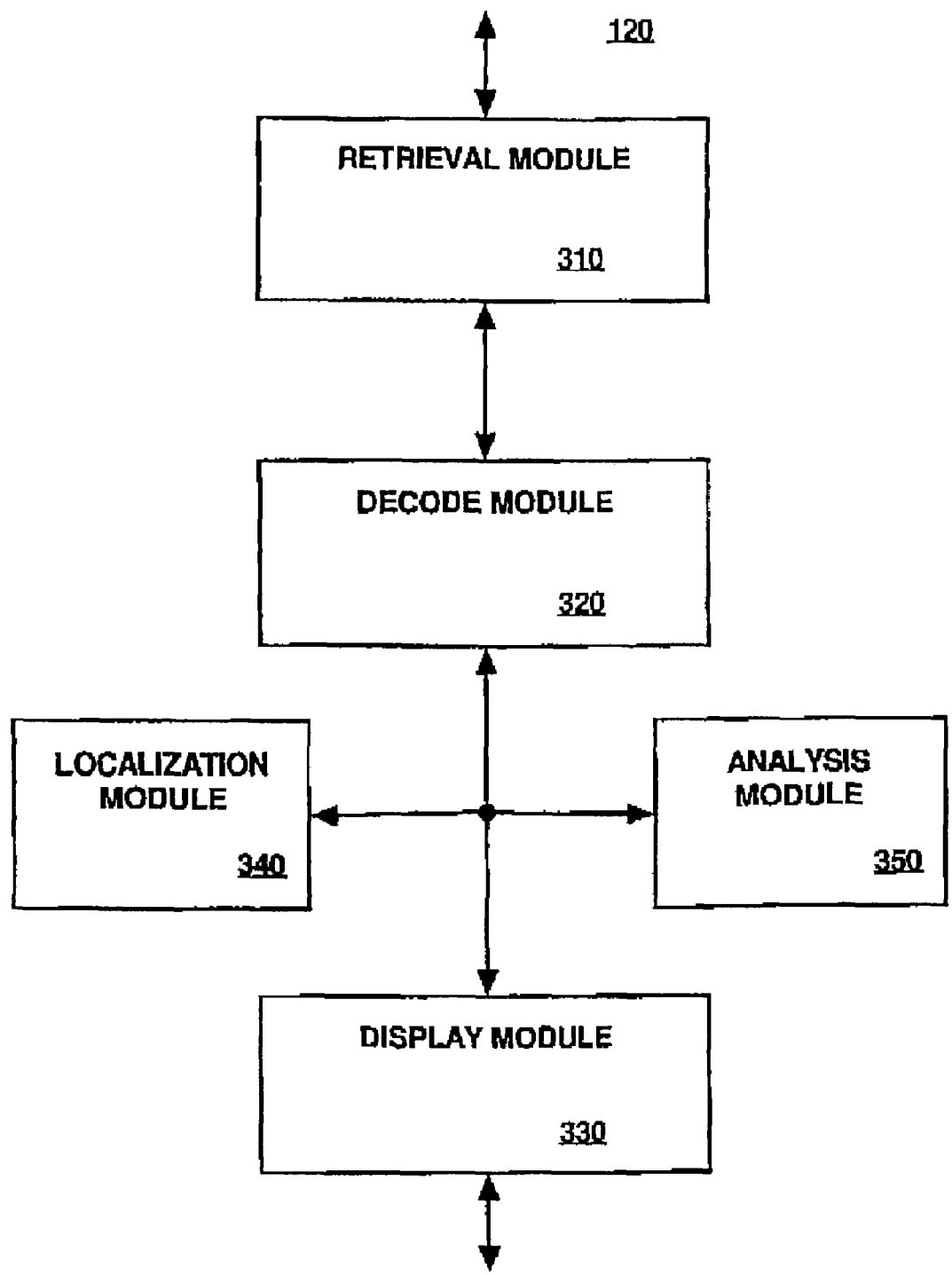
FIG. 3 illustrates a block diagram of an error processing module according to an embodiment of the present invention.

FIG. 3 illustrates a block diagram of an error processing module 120 according to an embodiment of the present invention. As shown in FIG. 3, the error processing module 120 includes a retrieval module 310, a decode module 320, a display module 330, a localization module 340, and an analysis module 350. The retrieval module 310 may be configured to retrieve the boot errors from the non-volatile storage 115.

The decode module 320 may be configured to decode the boot errors retrieved by the retrieval module 310. The decode module 320 may decode the errors according to one or more data processing system types. In other words, the decode module 320 may account for variances that exist across different data processing systems. The variance in data processing system types may be due to a variety of factors such as the operating system (WINDOWS, Unix, etc.), vendors (DELL, GATEWAY, etc.), by models, and the like. In an embodiment of the present invention, the decode module 320 may account for the variances by accessing one or more tables which include the boot error information for different data processing system types (not shown). The tables, such as text files, binary files, databases, and the like may be updated by the decode module 320 and/or by external entities. In this way, boot error decoding information may be updated as new data processing systems are introduced and old data processing systems are modified or deleted.

The display module 330 may be configured to display the errors decoded by the decode module 320. As will be discussed shortly, the display module 330 may also be configured to display interpreted error messages from the localization module 340 and the analysis results from the analysis module 350.

The localization module 340 may be configured to interpret the decoded error messages from the decode module 320 in one or more languages, the interpreted error messages may be displayed by the display module 330. For example, the error messages may be displayed in English for an English speaker and in French for a French speaker. In an embodiment of the present invention, the localization module 340 may provide translations by accessing one or more tables (text files, binary files, databases, and the like) which include error messages in various languages corresponding to the boot errors (not shown). The tables may be updated by the localization module 340 and/or by external entities. In this way, localization information may be updated as more languages are added and existing languages are modified or deleted.

Figure 4:
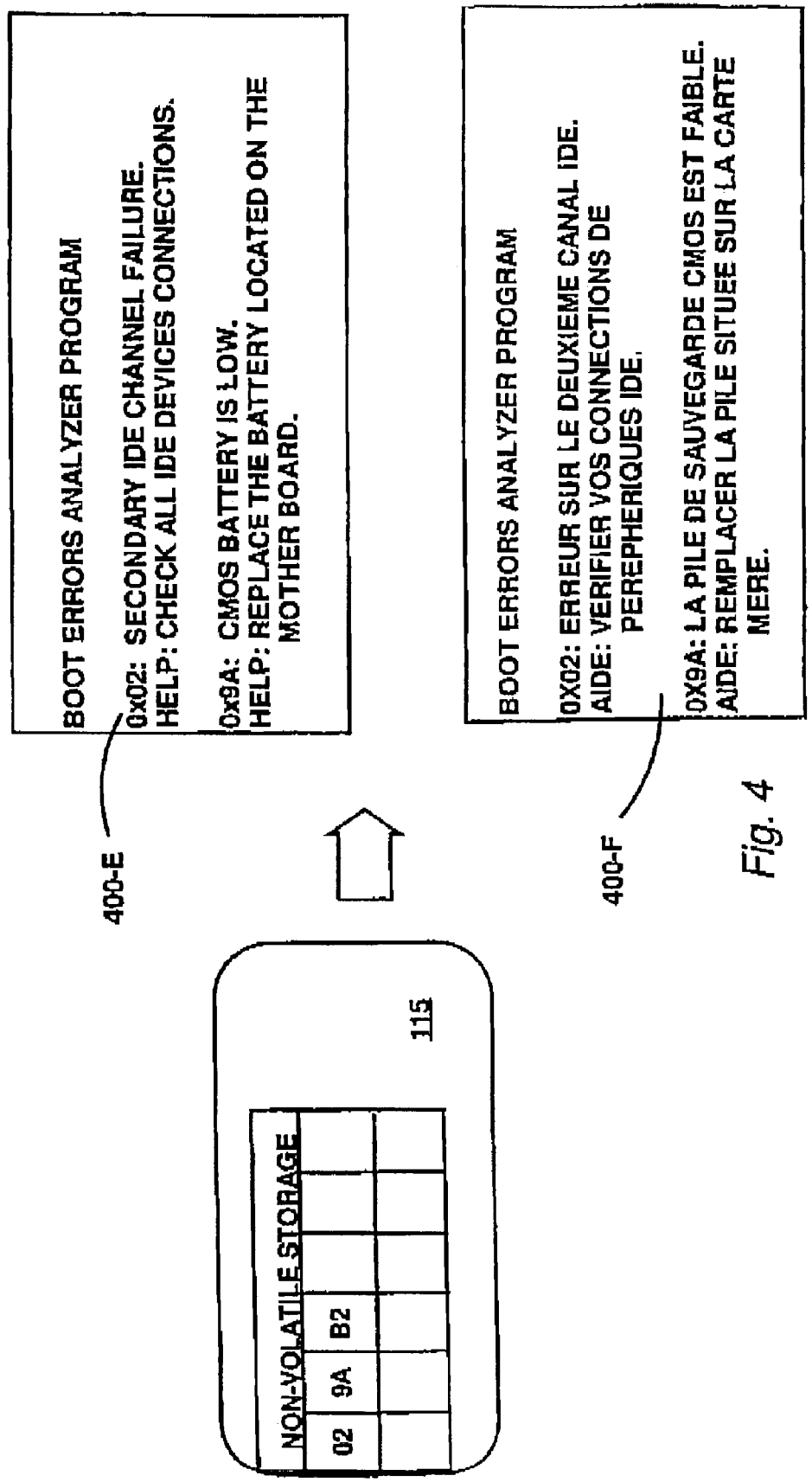
FIG. 4 illustrates a localization scheme according to an embodiment of the present invention.

FIG. 4 illustrates a localization scheme 400 according to an embodiment of the present invention. As shown in FIG. 4, a display 400-E displays the messages in English while a display 400-F displays the messages in French. It should be understood that the messages may be displayed in many other languages.

Referring back to FIG. 3, the analysis module 350 may be configured to analyze the boot errors retrieved from the non-volatile storage 115. The types of analysis may include historical and statistical. For example, using historical data, the errors may be analyzed to determine a trend of errors. It may be that certain components tend to fail at a certain lifetime stage of the data processing system. In another example, statistical analysis may be performed to determine most problematic components or combination of components. It should be understood that other types of analysis may be performed. The analysis information may also be interpreted by the localization module 340 and then displayed by the display module 330 in the user's native language.

The analysis information may be useful. For example, the information may be used to take proactive actions, such as scheduling component replacements, so that down time due to components failures is minimized. For a vendor, another use of the analysis is to determine the type and length of warranties to provide for different data processing systems. Again, these are but a few of the uses of the analysis performed.

Note that the error log module 110, the retrieval module 310, the decode module 320, the display module 330, the localization module 340, and the analysis module 350 may all reside in a single data processing system such as a standalone desktop computer. Note also that one or more of the modules may reside in a data processing system separate from data processing system(s) where other modules reside. The modules may be connected to each other such as through a network.

At one extreme, all modules may reside in a single data processing system. In this instance, the data processing system may have the capability to log, display, and analyze its own boot errors as well as boot errors of other data processing systems. The data processing system may be capable of analyzing its own boot errors even if one or more of the boot errors are fatal, i.e. the booting did not complete. In one embodiment, the analysis module 350 may be part of the data processing system's BIOS, and the user may access the analysis module 350 by interrupting the normal boot process, for example, by using function keys of a keyboard. Once the analysis module 350 is activated, the results of the previous boot attempt(s) may be retrieved, decoded, analyzed, localized, and displayed.

On the other hand, the modules may be distributed over different physical data processing systems and connected with each other over a network. For example, a first data processing system may include the error log module 110 and a second data processing system may include the retrieval module 310, the decode module 320, the display module 330, the localization module 340, and the analysis module 350. In this manner, the first data processing system is able to log the boot errors of itself or the errors of other data processing systems, and the second data processing system is able to decode, display, interpret, and analyze boot errors recorded by the first data processing system.

In one embodiment, each individual module may itself be spread into multiple data processing systems. For example, a first part of the error log module 110 may reside in one data processing system and may direct the error codes to a network connection. A second part of the error log module 110, residing in another data processing system, may listen to the messages from the network connection and record the errors to the non-volatile storage 115.

It is important to note that the modules may be implemented in many forms. For example, one or more of the error log module 110, the retrieval module 310, the decode module 320, the display module 330, the localization module 340, and the analysis module 350 may be implemented as instructions in BIOS, as software applications, as dedicated firmware, in hardware, and any combination thereof.

Figure 5:
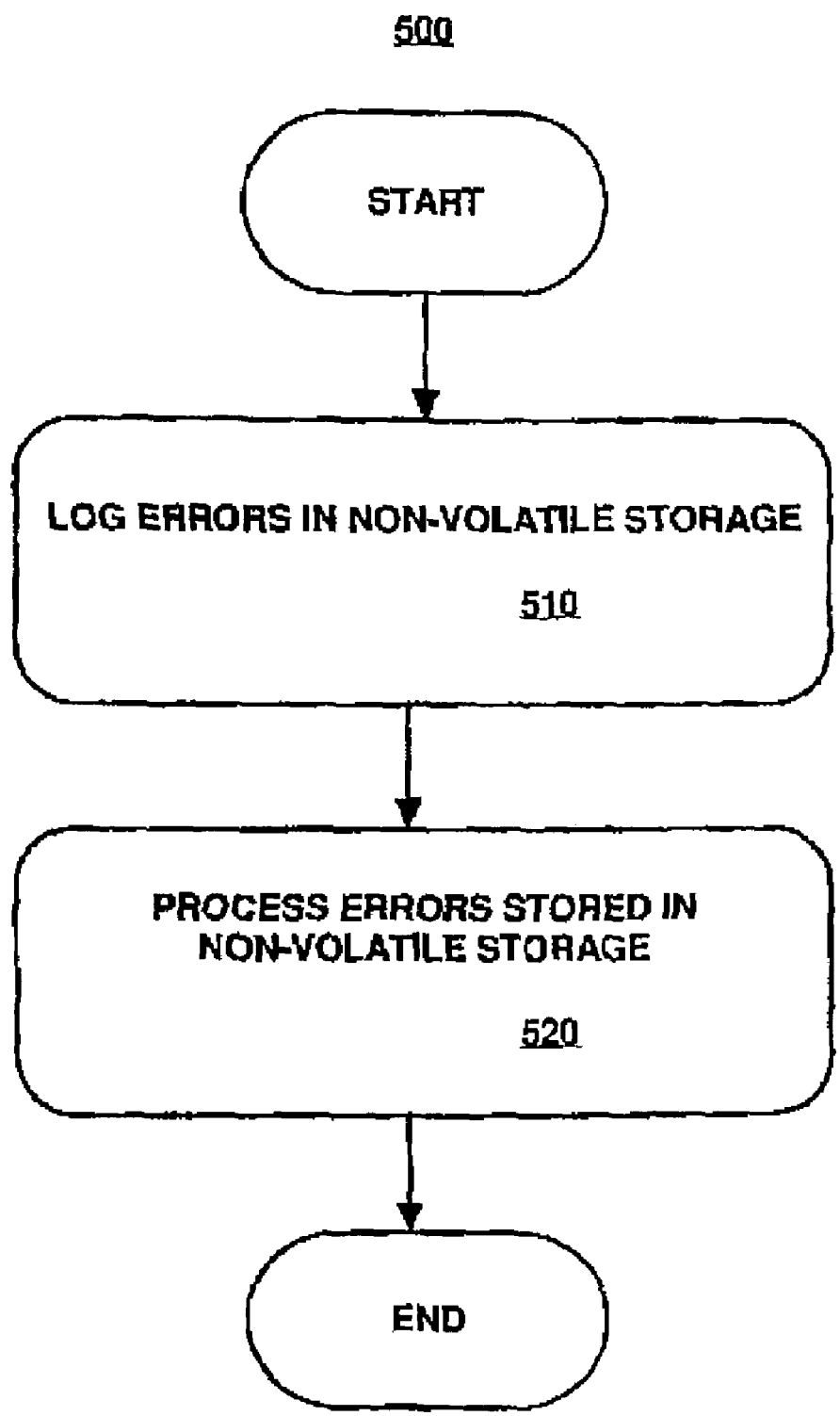
FIG. 5 illustrates a flow diagram of a method to manage boot errors of a data processing system according to an embodiment of the present invention.

FIG. 5 illustrates a flow diagram of a method 500 to manage boot errors of a data processing system according to an embodiment of the present invention. As shown in FIG. 5, the method 500 includes logging boot errors of the data processing system in a non-volatile storage 115 (step 510) and processing the boot errors stored in the non-volatile storage 115 (step 520). Again, non-volatile storage includes flash memory, hard disk, floppy disk, and the like.

Figure 6:
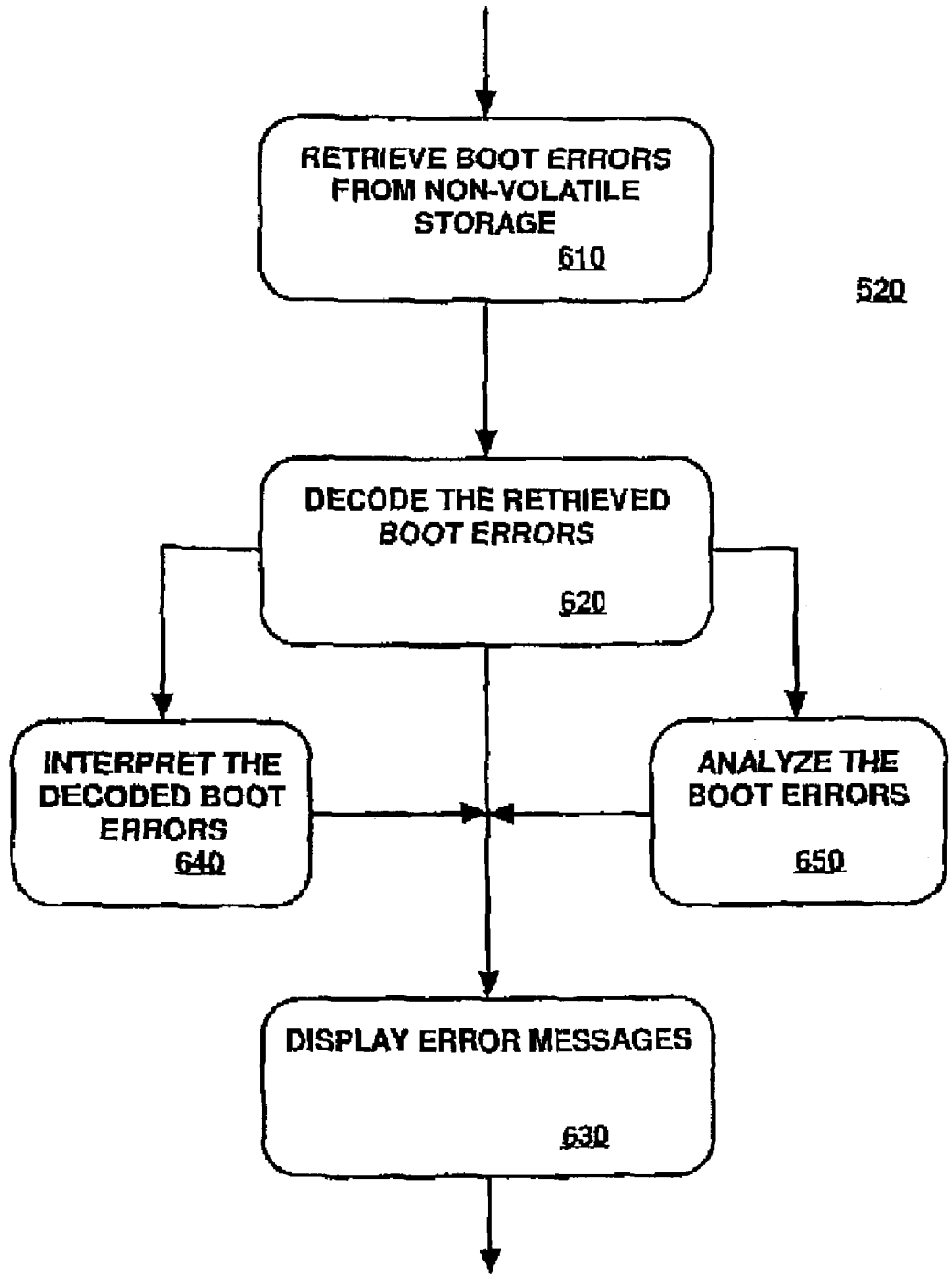
FIG. 6 illustrates a flow diagram of the boot error processing steps according to an embodiment of the present invention

FIG. 6 illustrates a flow diagram of the boot error processing step 520 according to an embodiment of the present invention. As shown in FIG. 6, the processing step 520 includes retrieving (step 610) the boot errors from the non-volatile storage 115, decoding (step 620) the boot errors retrieved in the retrieving step 610, and displaying (step 630) the boot errors decoded in the decoding step 620.

In one embodiment of the present invention, the processing 520 step may alternately include interpreting (step 640) the boot errors decoded in the decoding step 620 into one or more languages and the displaying step 630 may display the interpreted messages. In another embodiment, the processing 520 step may alternately include analyzing (step 650) the boot errors retrieved in the retrieving step 610 and the displaying step 630 may display the analysis results. In yet another embodiment, the analysis results may be interpreted in the interpreting step 640 and displayed in the displaying step 630. As discussed above, the types of analysis include historical, statistical, and the like.

Note that the steps of the method 500 may be modified or deleted and other steps may be added and not depart from the scope of the invention.

The method 500 may exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form. Exemplary computer readable storage devices include conventional data processing system RAM (random access memory), ROM (read only memory), EPROM (erasable, programmable ROM), EEPROM (electrically erasable, programmable ROM), flash memory, and magnetic or optical disks or tapes.

Exemplary computer readable signals, whether modulated using a carrier or not, are signals that a data processing system hosting or running the computer program may be configured to access, including signals downloaded through the Internet or other networks. Concrete examples of the foregoing include distribution of the program(s) on a CD ROM or via Internet download. In a sense, the Internet itself, as an abstract entity, is a computer readable medium. The same is true of computer networks in general.

While the invention has been described with reference to the exemplary embodiments thereof, it should be understood that various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. It should be understood that these and other variations are possible within the spirit and scope of the invention as defined in the following claims and their equivalents.

What is claimed is:

1. A data processing system comprising a boot error manager stored on a computer readable medium that is operable in the data processing system, comprising:
   a processor; and
   a memory, coupled to the processor, storing a plurality of instructions executed by the processor including instructions configured to boot and load an operating system stored in the memory, wherein the boot error manager comprises:
      an error log module configured to log one or more boot errors of the data processing system in a non-volatile storage; and
      an error processing module configured to process the one or more boot errors stored in the non-volatile storage, the error processing module comprising:
         a retrieval module configured to retrieve the one or more boot errors from the non-volatile storage;
         a decode module configured to decode the one or more boot errors retrieved by the retrieval module; and
         a display module configured to display the one or more boot errors decoded by the decode module,
         wherein the decode module is configured to decode boot errors for two or more data processing system types,
         wherein the decode module is configured to access one or more tables that include boot error information for the two or more data processing system types to account for variances in the two or more data processing system types, and
         wherein boot error decoding information is undated by the decode module based on the variances accounted for by the decode module.

2. The data processing system of claim 1, wherein the error processing module further comprises one or more of:
   a localization module configured to interpret the one or more boot errors in one or more languages; and
   an analysis module configured to analyze the one or more boot errors,
   wherein a type of analysis performed by the analysis module includes one or more of a historical analysis and a statistical analysis, and
   wherein the statistical analysis determines most problematic components or combination of problematic components in the data processing system.

3. The data processing system of claim 2, wherein the display module is configured to display one or more of:
   the one or more boot errors interpreted in the one or more languages by the localization module; and
   the one or more boot errors analyzed by the analysis module.

4. The data processing system of claim 1, wherein one or more of the error log module, the retrieval module, the decode module, and the display module reside in two or more data processing systems in which a first portion of the error log module, the decode module and the display module are located on a first data processing system and a second portion of the error log module, the decode module and the display module are located on a second data processing system.

5. The data processing system of claim 1, wherein one or more of the error log module, the retrieval module, the decode module, and the display module are implemented as instructions in BIOS, as software programs, as dedicated firmware, in hardware, and any combination thereof.

6. The data processing system of claim 1, wherein each of the one or more boot errors is stored by the error log module in the non-volatile memory with an error code and a time stamp corresponding to a recorded error time.

7. A method to manage boot errors of a data processing system, comprising:

logging boot errors of the data processing system in a non-volatile storage; and retrieving the one or more boot errors from the non-volatile storage;

decoding the one or more boot errors retrieved in the retrieving step; and displaying the one or more boot errors decoded in the decoding step, wherein the decode step decodes boot errors for two or more data processing system types, wherein the decoding step further comprises:

accessing one or more tables that include boot error information for the two or more data processing system types;

based on the boot error information accessed from the one or more tables, accounting for variances in the two or more data processing system types, and updating boot error decoding information based on the variances accounted for.

8. The method of claim 7, wherein the decoding step comprises: decoding boot errors for one or more data processing system types.

9. The method of claim 7, further comprising:

interpreting the one or more boot errors in one or more languages; and analyzing the one or more boot errors, wherein a type of analysis performed includes one or more of a historical analysis and a statistical analysis.

10. The method of claim 9, wherein the step of displaying further comprises one or more of:

displaying the one or more boot errors interpreted in the interpreting step; and displaying the one or more boot errors analyzed in the analyzing step.

11. The method of claim 7, further comprising:

interpreting the one or more boot errors in one or more languages; and analyzing the one or more boot errors, wherein a type of analysis performed by the analyzing step includes one or more of a historical analysis and a statistical analysis; and determining most problematic components or combination of problematic components in the data processing system based on results of the analyzing step.

* * * * *